United States Patent
Fleming (10) Patent No.: US 10,244,895 B2
(45) Date of Patent: Apr. 2, 2019

(54) AUTOMATED GRILL CLEANING SYSTEM (71) Applicant: Mark Fleming, Pompano, FL (US)

(72) Inventor: Mark Fleming, Pompano, FL (US)

( * ) Notice: Subject to any disclaimer, the term of this patent is extended or adjusted under 35 U.S.C. 154(b) by 234 days.

(21) Appl. No.: 15/252,780

(22) Filed: Aug. 31, 2016

(65) Prior Publication Data
US 2018/0056338 A1 Mar. 1, 2018

(51) Int. Cl.
*A47J 37/07* (2006.01)
*B08B 1/00* (2006.01)
*A47L 13/34* (2006.01)

(52) U.S. Cl.
CPC ....... *A47J 37/0786* (2013.01); *A47J 37/0704* (2013.01); *A47L 13/34* (2013.01); *B08B 1/005* (2013.01); *B08B 1/008* (2013.01); *B08B 1/002* (2013.01)

(58) Field of Classification Search
CPC ... A47J 37/0704; A47J 37/0786; B08B 1/008; B08B 1/00; B08B 1/1001; B08B 1/002; B08B 1/005; B08B 1/006
USPC ....... 99/357, 484; 15/4, 21.1, 77, 88.4, 97.1, 15/102, 246; 126/25 R
See application file for complete search history.

(56) References Cited

U.S. PATENT DOCUMENTS

| | | |
|---|---|---|
| 3,196,473 A | 7/1965 | Bell |
| 4,486,911 A | 12/1984 | Beke |
| 4,979,255 A * | 12/1990 | Buchnag ............. A47J 37/0786 15/256.5 |
| 6,098,229 A | 8/2000 | Ward |
| 6,817,932 B2 | 11/2004 | Furey |
| D674,671 S | 1/2013 | Borovicka et al. |
| 8,347,442 B2 | 1/2013 | Peacocke |
| 9,788,690 B2 * | 10/2017 | Rosian ................ A47J 37/0704 |
| 2008/0141997 A1 | 6/2008 | Druin |
| 2016/0029779 A1* | 2/2016 | Woods ................... A46B 13/02 15/21.1 |

FOREIGN PATENT DOCUMENTS

WO WO2010099553 9/2010

* cited by examiner

*Primary Examiner* — Reginald Alexander (57) ABSTRACT

An automated grill cleaning system for automatically cleaning a grill in a cooker includes a cooking unit that may be used to cook. The cooking unit has a housing and a grill is positioned in the housing. The housing has an outer wall. A cleaning unit is coupled to the cooking unit and the cleaning unit is positioned on the outer wall. The cleaning unit selectively engages the grill. The cleaning unit urges itself to travel along the grill to abrade debris from the grill.

12 Claims, 9 Drawing Sheets

AUTOMATED GRILL CLEANING SYSTEM

BACKGROUND OF THE DISCLOSURE

Field of the Disclosure

The disclosure relates to cleaning devices and more particularly pertains to a new cleaning device for automatically cleaning a grill in a cooker.

SUMMARY OF THE DISCLOSURE

An embodiment of the disclosure meets the needs presented above by generally comprising a cooking unit that may be used to cook. The cooking unit has a housing and a grill is positioned in the housing. The housing has an outer wall. A cleaning unit is coupled to the cooking unit and the cleaning unit is positioned on the outer wall. The cleaning unit selectively engages the grill. The cleaning unit urges itself to travel along the grill to abrade debris from the grill.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 9 thereof, a new cleaning device embodying the principles and concepts of an embodiment of the disclosure and generally designated by the reference numeral 10 will be described.

As best illustrated in FIGS. 1 through 9, the automated grill cleaning system 10 generally comprises a cooking unit 12 that may be manipulated to cook. The cooking unit 12 has a housing 14 and a grill 16 that is positioned in the housing 14. The housing 14 has an outer wall 18 and the outer wall 18 has an exposed edge 20. The outer wall 18 has a first lateral side 22 and the grill 16 is substantially planar with the exposed edge 20. The cooking unit 12 may comprise a gas grill, a charcoal grill or other cooking unit involving a grill.

A cleaning unit 24 is coupled to the cooking unit 12. The cleaning unit 24 is positioned on the outer wall 18 and the cleaning unit 24 selectively engages the grill 16. The cleaning unit 24 urges itself to travel along the grill 16. Thus, the cleaning unit 24 may abrade debris 26 from the grill 16. The debris 26 may comprise grease from cooking, food particles, soot or other debris associated with grilling food.

The cleaning unit 24 comprises a mount 28 that is removably coupled to the housing 14. The mount 28 comprises a first arm 30 that has a first end 32, a second end 34 and an exterior surface 36 extending therebetween. The exterior surface 36 has a first side 38, a second side 40 and a third side 42. The second side 40 abuts the exposed edge 20 of the outer wall 18. The first arm 30 is positioned to be substantially coextensive with the first lateral side 22 of the outer wall 18 having the third side 42 facing the grill 16.

The first arm 30 is substantially hollow and the third side 42 has a slot 44 extending into an interior of the first arm 30. The slot 44 is substantially coextensive with the first arm 30. A second arm 46 is provided and the second arm 46 has a primary surface 48. The primary surface 48 is coupled to the first side 38 of the first arm 30. The second arm 46 is positioned adjacent to the first end 32.

The second arm 46 is oriented to form an angle with respect to the first arm 30 such that the mount 28 has an L-shape. The second arm 46 has a distal end 50 with respect to the second arm 46. The distal end 50 is open and the second arm 46 is substantially hollow. The second arm 46 is coupled to the outer wall 18 of the housing 14. A foot 52 slidably engages the distal end 50 of the second arm 46. The foot 52 is coupled to the outer wall 18 of the housing 14.

A scrubber 54 is movably coupled to the mount 28 and the scrubber 54 is positioned to frictionally engage the grill 16. Thus, the scrubber 54 removes the debris 26 from the grill 16. The scrubber 54 comprises a cleaning member 56 that has a primary end 58 and a secondary end 60. The cleaning member 56 comprises a first half 62 that slidably engages a second half 64. Thus, the cleaning member 56 has a slidably adjustable length.

The second half 64 has a plurality of apertures 66 extending therethrough. The apertures 66 are spaced apart from each other and distributed along the second half 64. A lock 68 is coupled to the first half 62 and the lock 68 releasably engages a selected one of the apertures 66. Thus, the cleaning member 56 is retained at a selected length.

The primary end 58 is rotatably coupled to the third side 42 of the first arm 30. Thus, the cleaning member 56 is selectively positioned in a stored position and a deployed position. The cleaning member 56 is coextensive with the first arm 30 when the cleaning member 56 is in the stored position. The cleaning member 56 extends over the grill 16 when the cleaning member 56 is in the deployed position.

A plurality of spacers 70 is provided and each of the spacers 70 is coupled to and extends downwardly from the cleaning member 56. The spacers 70 are spaced apart from each other and are distributed between the primary end 58 and the secondary end 60. A plurality of biasing members 72 is provided. Each of the biasing members 72 is positioned around an associated one of the spacers 70. Each of the spacers 70 has a distal end 74 with respect to the cleaning member 56.

A plurality of pads 76 is provided. Each of the pads 76 has a first surface 78 and a second surface 80. The second surface 80 corresponding to a selected one of the pads 76 is removably coupled to the distal end 74 of each of the spacers 70. The first surface 78 corresponding to the selected pad 76 frictionally engages the grill 16 when the cleaning member 56 is positioned in the deployed position. Thus, the selected pad 76 may remove the debris 26 from the grill 16. Each of the pads 76 may be comprised of an abrasive material thereby enhancing removing the debris 26 from the grill 16. Each the plurality of pads 76 has a unique length with respect to each other.

Each of the biasing members 72 extends between the second surface 80 corresponding to the selected pad 76 and the cleaning member 56. Thus, the selected pad 76 is biased away from the cleaning member 56. The biasing members 72 facilitate the selected pad 76 to float on each of the spacers 70. A plurality of screws 86 is provided. Each of the screws 86 extends through the selected pad 76 and engages the distal end 74 of an associated spacer 70. Thus, the selected pad 76 is removably coupled to the cleaning member 56.

A drive 88 is provided and the drive 88 is coupled to the mount 28. The drive 88 is mechanically coupled to the scrubber 54. Thus, the drive 88 urges the scrubber 54 along the grill 16 to remove the debris 26 from the grill 16. The drive 88 comprises a plurality of first pulleys 90. Each of the first pulleys 90 is rotatably coupled to the first arm 30. Each of the first pulleys 90 is positioned within the first arm 30. The first pulleys 90 are spaced apart from each other and are distributed along the first arm 30.

A first belt 92 is positioned around each of the first pulleys 90 and a retainer 94 is coupled to the first belt 92. The first belt 92 is aligned with the slot 44 in the first arm 30 and the retainer 94 extends outwardly from the slot 44. The retainer 94 has a distal end 96 with respect to the first belt 92. The primary end 58 of the cleaning member 56 is rotatably coupled to the distal end 96 of the retainer 94.

A motor 98 is coupled to the second arm 46. The motor 98 rotates in a first direction and a second direction. The motor 98 may comprise an electrical motor or the like. A second pulley 100 is coupled to the motor 98 and the motor 98 rotates the second pulley 100 when the motor 98 is turned on. The second pulley 100 is positioned within the second arm 46.

A second belt 102 is coupled between the second pulley 100 and an associated one of the first pulleys 90. Thus, the motor 98 rotates the first belt 92 when the motor 98 is turned on. The motor 98 urges the cleaning member 56 to travel along the slot 44 in a first direction when the motor 98 rotates in the first direction. The motor 98 urges the cleaning member 56 to travel along the slot 44 in a second direction when the motor 98 rotates in the second direction.

A control 104 is coupled to the mount 28 and the control 104 may be manipulated. The control 104 is electrically coupled to the drive 88 and the control 104 controls operational parameters of the drive 88. The control 104 comprises a processor 106 that is positioned within the control 104. The processor 106 is electrically coupled to the motor 98. The processor 106 actuates the motor 98 to alternatively rotate in the first direction and the second direction. The processor 106 may be an electronic processor or the like.

A switch 108 is coupled to the control 104 and the switch 108 may be manipulated. The switch 108 is electrically coupled to the processor 106. A power supply 110 is positioned within the control 104 and the power supply 110 is electrically coupled to the switch 108. The power supply 110 comprises at least one battery 112. The processor 106 may include an electronic timer. The electronic timer may turn the processor 106 off when the processor 106 has been on for a predetermined duration of time. Thus, the cleaning unit 24 may not need to be monitored when the cleaning unit 24 is turned on.

Figure 1:
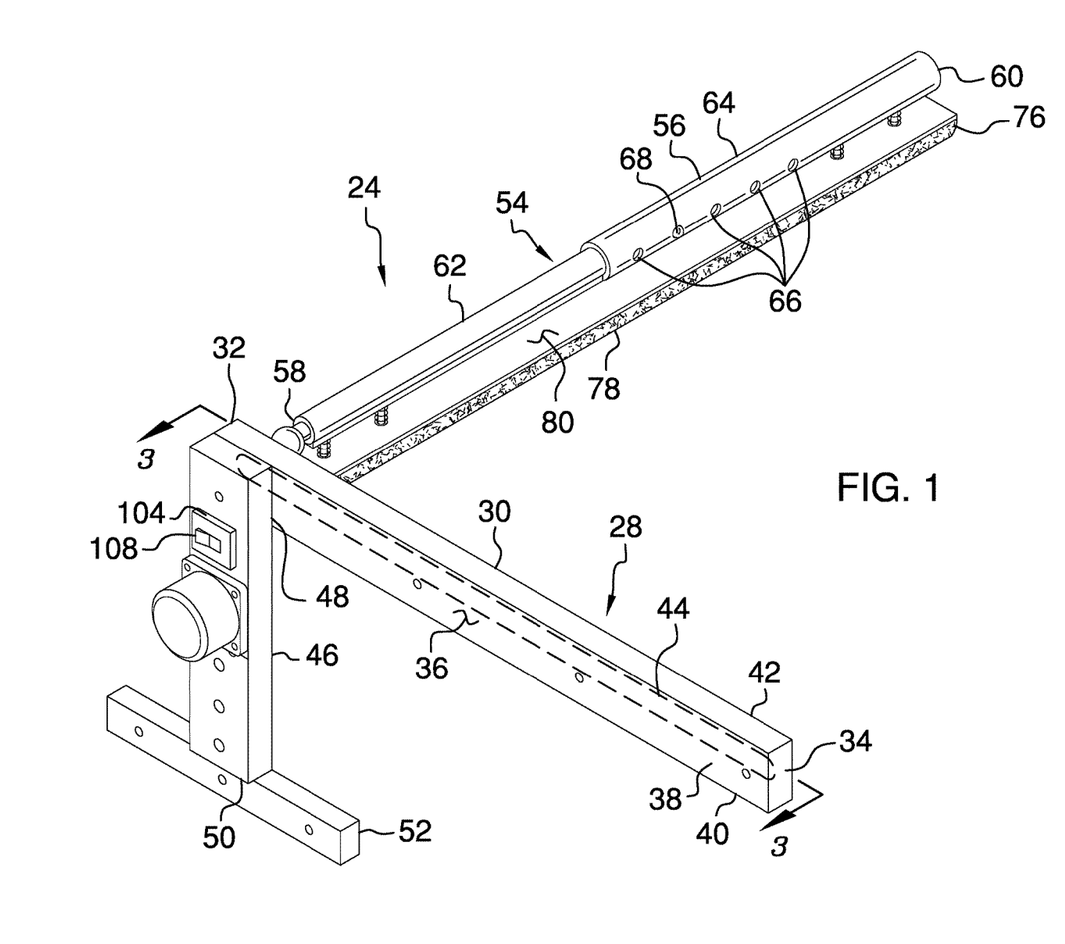
FIG. 1 is a perspective view of a automated grill cleaning system according to an embodiment of the disclosure.
Figure 2:
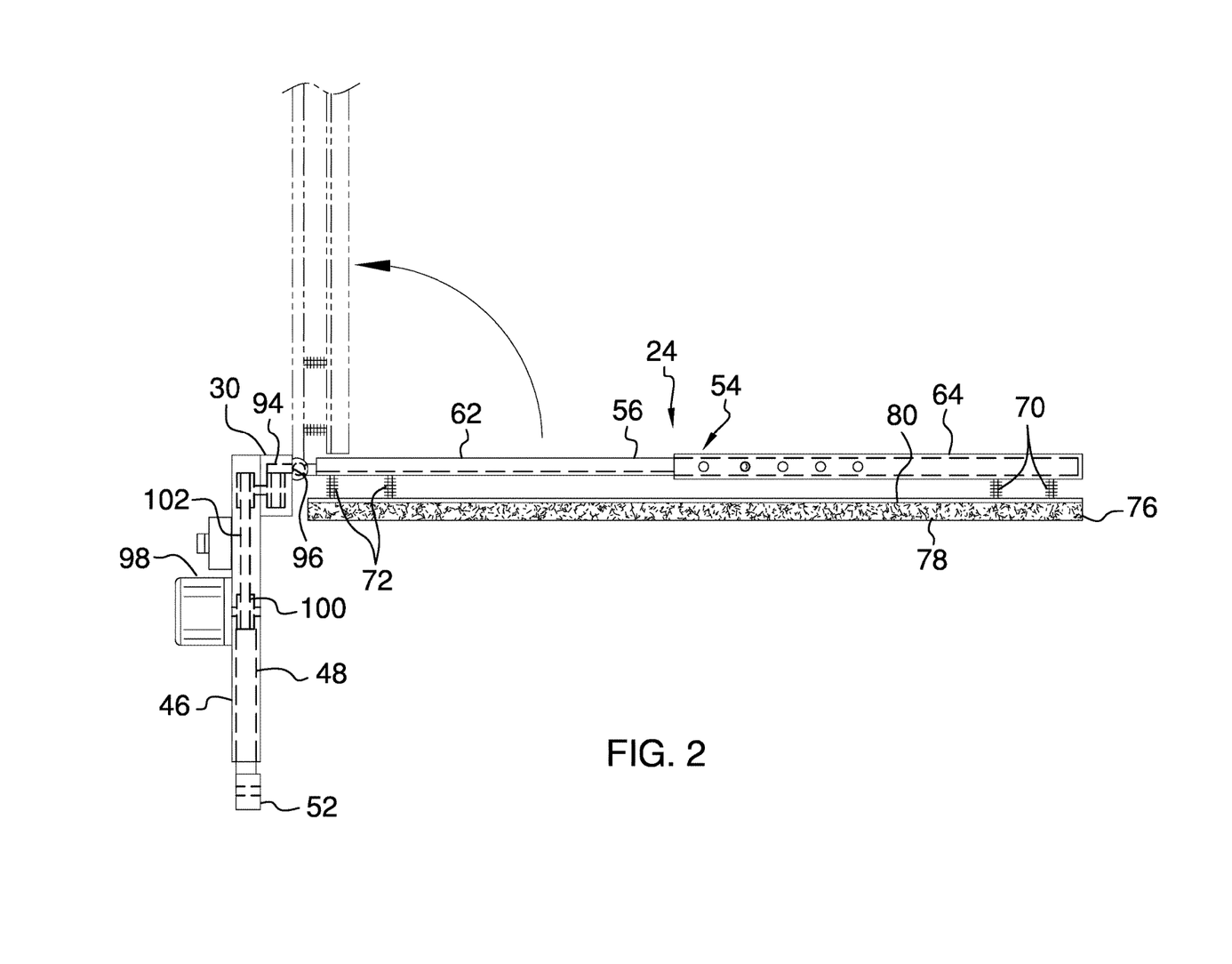
FIG. 2 is a front view of an embodiment of the disclosure.
Figure 3:
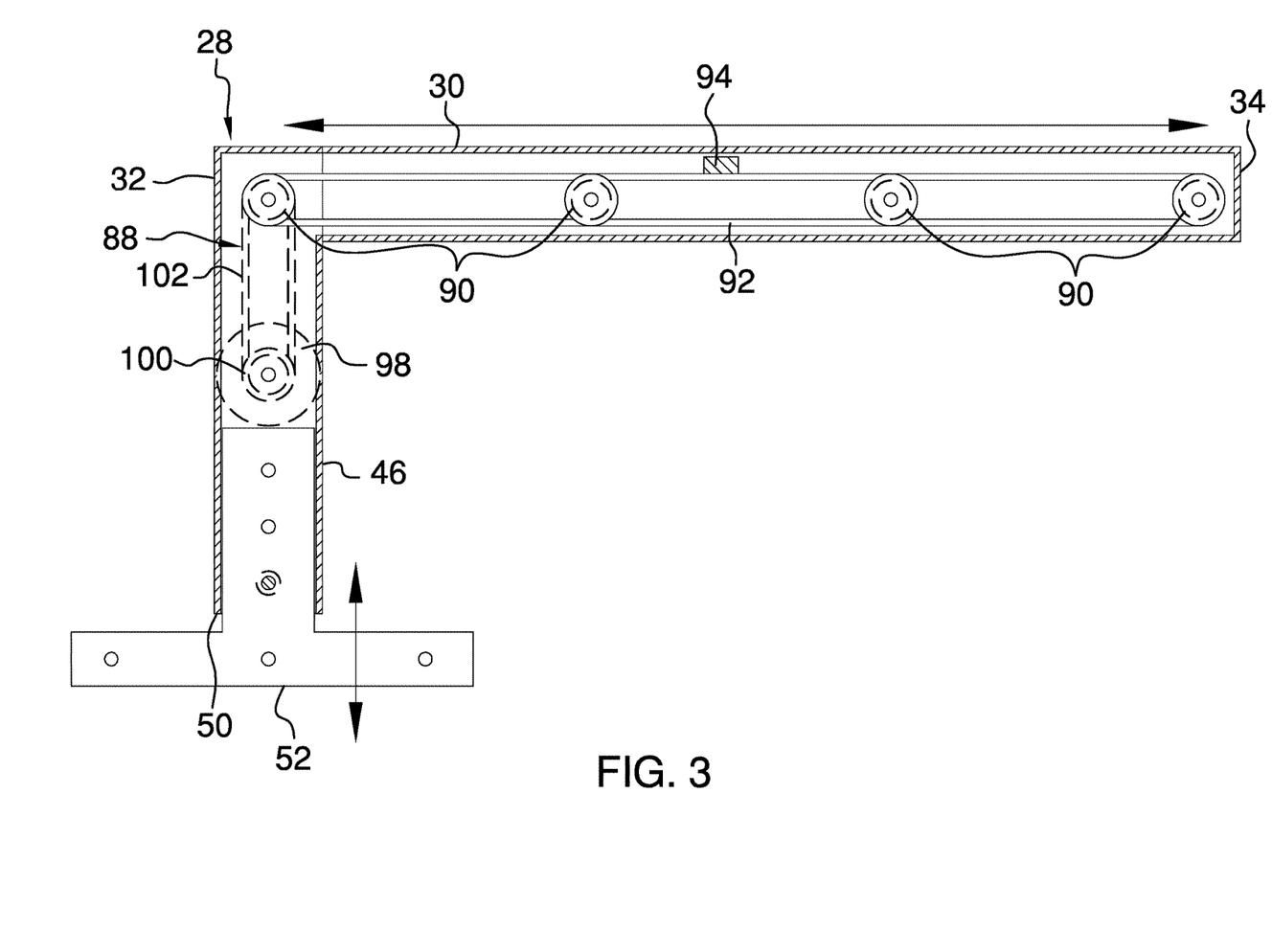
FIG. 3 is a cross sectional view taken along line 3-3 of FIG. 1 of an embodiment of the disclosure.
Figure 4:
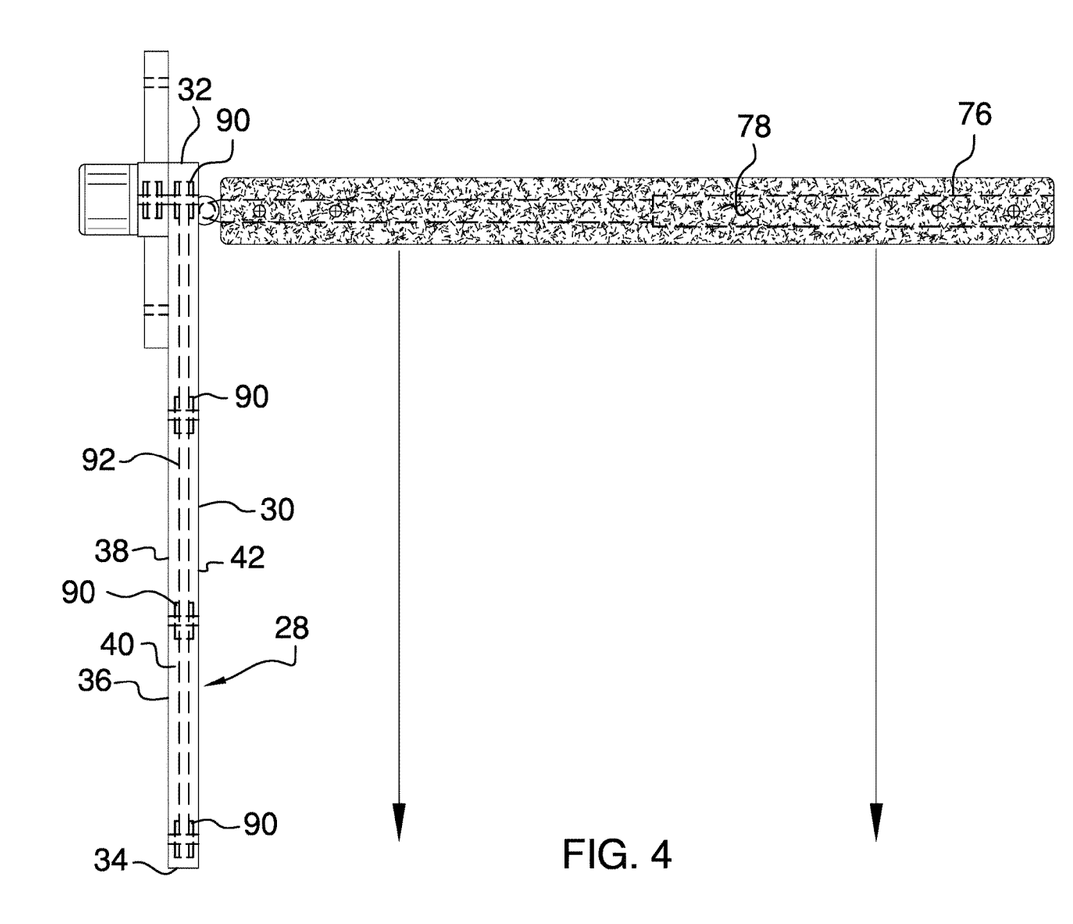
FIG. 4 is a bottom view of an embodiment of the disclosure.
Figure 5:
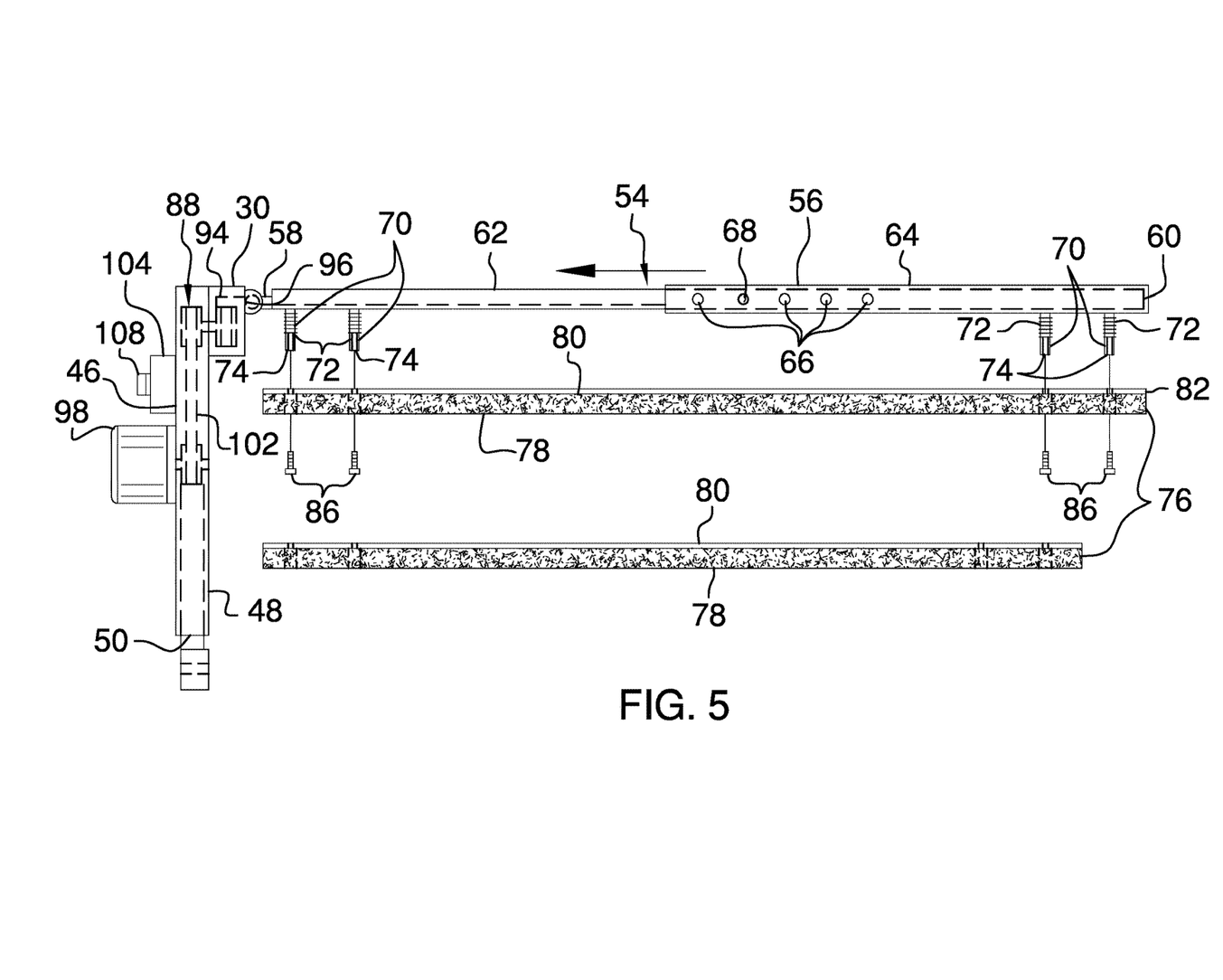
FIG. 5 is a front perspective view of an embodiment of the disclosure.
Figure 6:
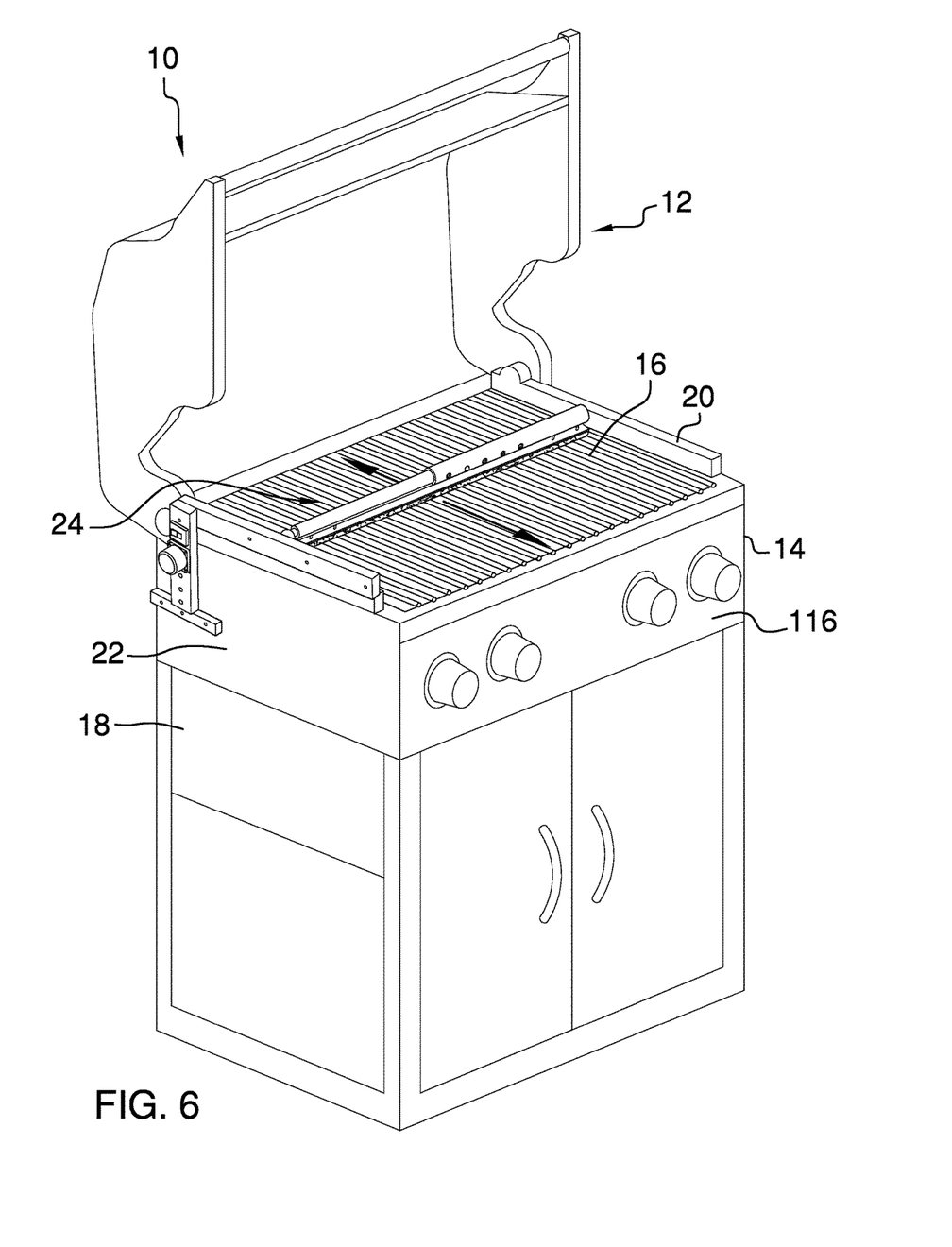
FIG. 6 is a perspective in-use view of an embodiment of the disclosure.
Figure 7:
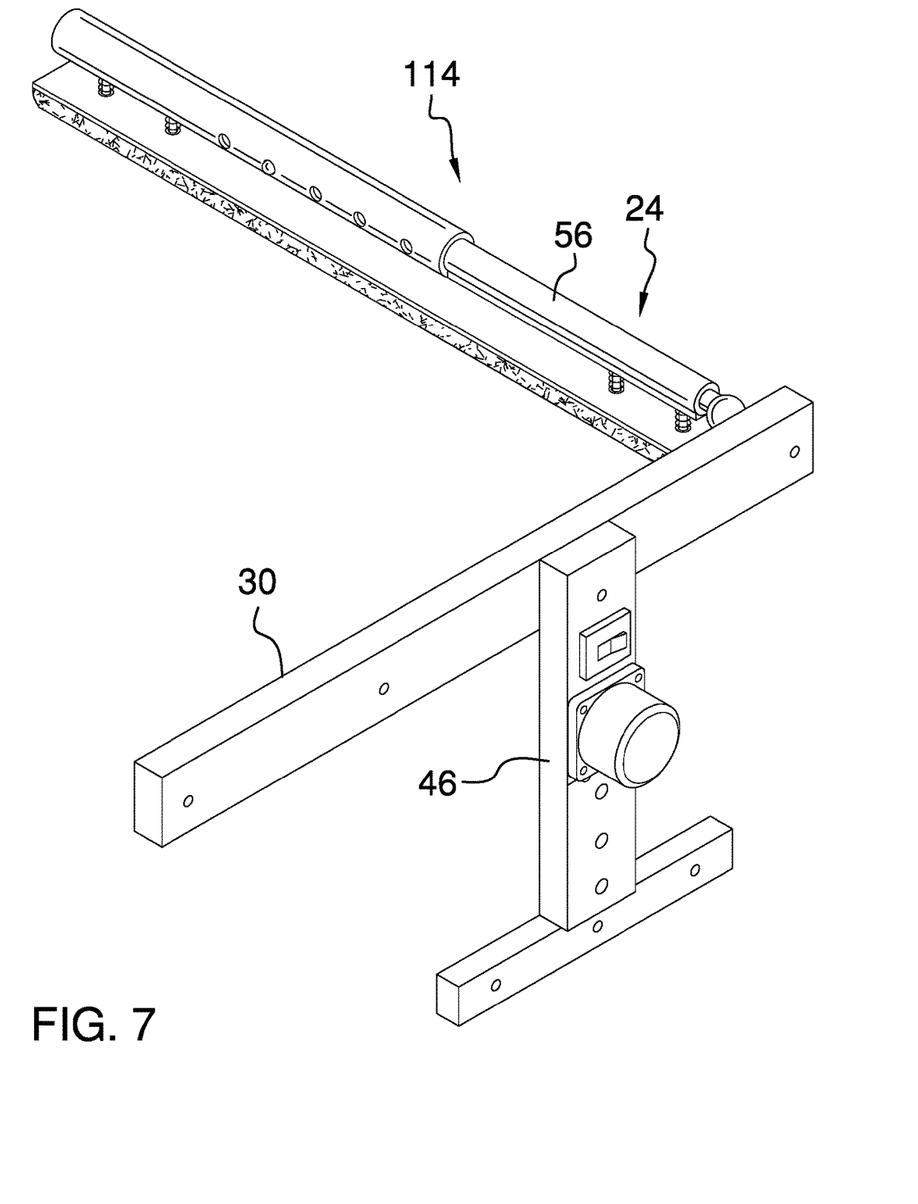
FIG. 7 is a perspective view of an alternative embodiment of the disclosure.
Figure 8:
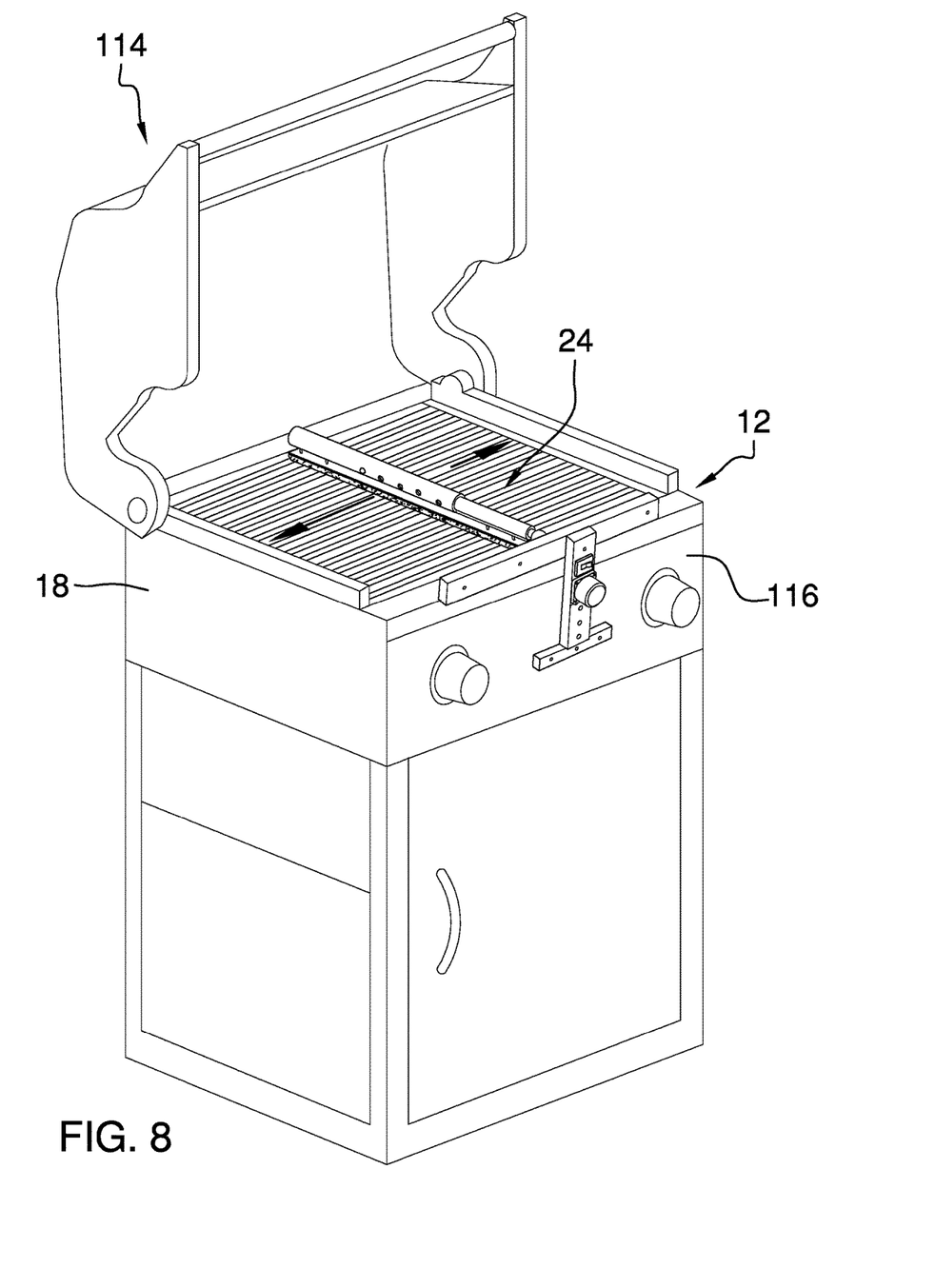
FIG. 8 is a perspective in-use view of an alternative embodiment of the disclosure.
Figure 9:
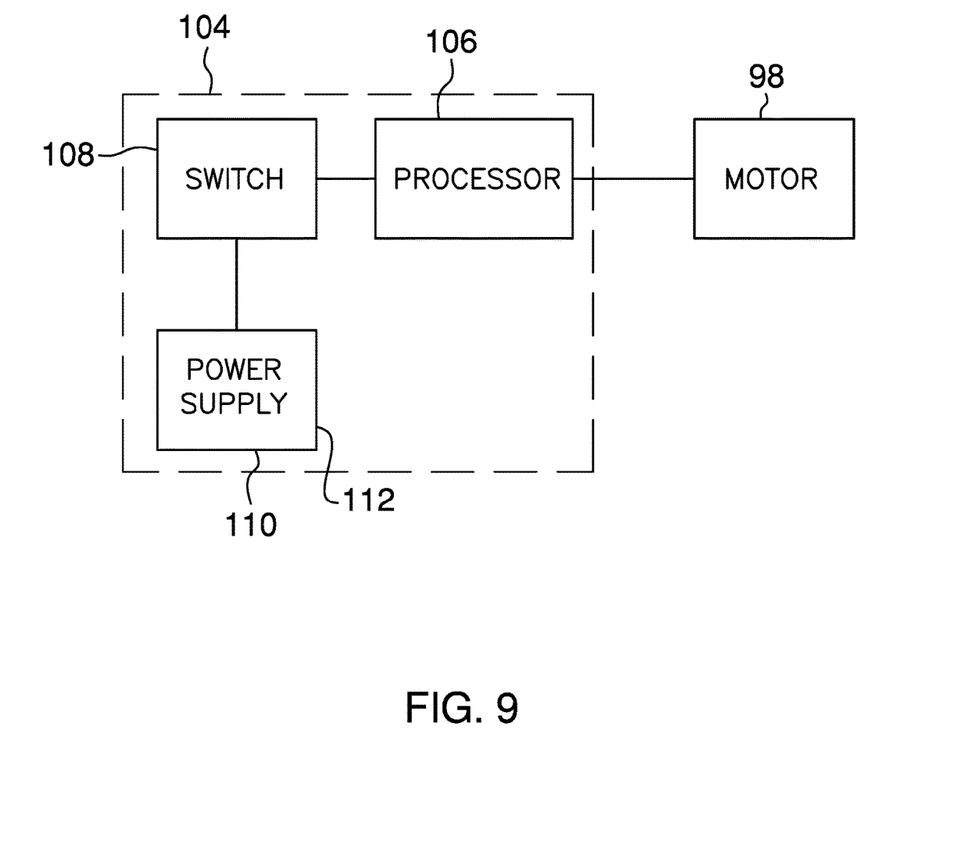
FIG. 9 is a schematic view of an embodiment of the disclosure.

In an alternative embodiment 114 as shown in FIGS. 7 and 8, the second arm 46 may be substantially centrally positioned on the first arm 30. The mount 28 may be positioned on the exposed edge 20 corresponding to a front side 116 of the housing 14. Thus, the cleaning member 56 extends rearwardly along the grill 16 when the cleaning member 56 is in the deployed position. The grill 16 may have a length that is greater than a width of the grill 16. The long pad 82 may be coupled to the cleaning member 56 when the mount 28 is positioned on the first lateral side 22 of the cooking unit 12. The short pad 84 may be coupled to the cleaning member 56 when the mount 28 is positioned on the front side 116 of the cooking unit 12.

In use, the cleaning member 56 is positioned in the deployed position and the switch 108 is manipulated to turn motor 98 on. The motor 98 alternatively rotates in the first direction and the second direction. The cleaning member 56 is adjusted to a selected length and the selected pad 76 is coupled to the cleaning member. The selected pad 76 frictionally engages the grill 16 and the selected pad 76 abrades the debris 26 from the grill 16 when the motor 98 rotates. The electronic timer may turn the processor 106 off after the predetermined duration of time. The cleaning member 56 is positioned in the stored position when the grill 16 is used for cooking.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automated grill cleaning system comprising:
    a cooking unit being configured to cook, said cooking unit having a housing and a grill being positioned in said housing, said housing having an outer wall, said outer wall of said housing having an exposed edge, said outer wall having a first lateral side, said grill being substantially aligned with said exposed edge; and
    a cleaning unit being coupled to said cooking unit, said cleaning unit being positioned on said outer wall, said cleaning unit selectively engaging said grill, said cleaning unit urging itself to travel along said grill wherein said cleaning unit is configured to abrade debris from said grill, said cleaning unit comprises a mount being removably coupled to said housing, said mount comprising:
a first arm having a first end, a second end and an exterior surface extending between said first end and said second end, said exterior surface having a first side, a second side and a third side, said second side coextensively abutting said exposed edge of said outer wall, said first arm being positioned on said first lateral side of said outer wall having said third side facing said grill, said first arm being substantially hollow, said third side having a slot extending therethrough, said slot being substantially coextensive with said first arm.

2. The system according to claim 1, further comprising a second arm having a primary surface, said primary surface being coupled to said first side of said first arm, said second arm being positioned adjacent to said first end, said second arm being oriented to form an angle with respect to said first arm such that said mount has an L-shape, said second arm having a distal end with respect to said second arm, said distal end being open, said second arm being substantially hollow, said second arm being coupled to said outer wall of said housing.

3. The system according to claim 2, further comprising a foot slidably engaging said distal end of said second arm, said foot being coupled to said outer wall of said housing.

4. The system according to claim 1, wherein:
said cleaning unit comprises a mount being removably coupled to said housing;
said mount includes a first arm; and
said cleaning unit includes a drive being positioned within coupled to said mount such that said drive urges said scrubber along said grill wherein said scrubber is configured to remove the debris from said grill, said drive comprising a plurality of first pulleys, each of said first pulleys being rotatably coupled to said first arm, each of said first pulleys being positioned within said first arm, said first pulleys being spaced apart from each other and being distributed along said first arm.

5. The system according to claim 1, wherein said cleaning unit includes a control being coupled to said mount wherein said control is configured to be manipulated, said control being electrically coupled to said drive such that said control controls operational parameters of said drive, said control comprising a processor being positioned within said control, said processor being electrically coupled to said motor such that said processor actuates said motor to alternatively rotate in said first direction and said second direction.

6. The system according to claim 5, further comprising:
a switch being coupled to said control wherein said switch is configured to be manipulated, said switch being electrically coupled to said processor; and
a power supply being positioned within said control, said power supply being electrically coupled to said switch, said power supply comprising at least one battery.

7. The system of claim 1, further comprising:
said cleaning unit further comprising:
said mount comprising a second arm having a primary surface, said primary surface being coupled to said first side of said first arm, said second arm being positioned adjacent to said first end, said second arm being oriented to form an angle with respect to said first arm such that said mount has an L-shape, said second arm having a distal end with respect to said second arm, said distal end being open, said second arm being substantially hollow, said second arm being coupled to said outer wall of said housing, and
a foot slidably engaging said distal end of said second arm, said foot being coupled to said outer wall of said housing;
a scrubber being movably coupled to said mount, said scrubber being positioned to frictionally engage said grill thereby facilitating said scrubber to remove the debris from said grill, said scrubber comprising:
a cleaning member having a primary end and a secondary end, said cleaning member comprising a first half slidably engaging a second half such that said cleaning member has a slidably adjustable length, said primary end being rotatably coupled to said third side of said first arm, said cleaning member being selectively positioned in a stored position having said cleaning member being coextensive with said first arm, said cleaning member being selectively positioned in a deployed position having said cleaning member extending over said grill,
a plurality of spacers, each of said spacers being coupled to and extending downwardly from said cleaning member, said spacers being spaced apart from each other and being distributed between said primary end and said secondary end,
a plurality of biasing members, each of said biasing members being positioned around an associated one of said spacers, and
a plurality of pads, each of said pads having a first surface and a second surface, said second surface corresponding to a selected one of said pads being removably coupled to said spacers such that said first surface corresponding to said selected pad frictionally engages said grill when said cleaning member is positioned in said deployed position wherein said selected is configured to remove the debris from said grill, each of said biasing members extending between said second surface corresponding to said selected pad and said cleaning member such that said selected pad is biased away from said cleaning member;
a drive being positioned within said mount, said drive being mechanically coupled to said scrubber such that said drive urges said scrubber along said grill wherein said scrubber is configured to remove the debris from said grill, said drive comprising:
a plurality of first pulleys, each of said first pulleys being rotatably coupled to said first arm, each of said first pulleys being positioned within said first arm, said first pulleys being spaced apart from each other and being distributed along said first arm,
a first belt being positioned around each of said first pulleys,
a retainer being coupled to said first belt, said retainer extending outwardly from said slot, said primary end of said cleaning member being rotatably coupled to said retainer,
motor being coupled to said second arm, said motor rotating in a first direction and a second direction,
a second pulley being coupled to said motor such that motor rotates said second pulley when said motor is turned on, said second pulley being positioned within said second arm, and
a second belt being coupled between said second pulley and an associated one of said first pulleys such that said second pulley rotates said first pulleys when said motor is turned on, said motor urging said cleaning member to travel along said slot when said motor is turned on; and a control being coupled to said mount wherein said control is configured to be manipulated, said control being electrically coupled to said drive such that said control controls operational parameters of said drive, said control comprising:
  a processor being positioned within said control, said processor being electrically coupled to said motor such that said processor actuates said motor to alternatively rotate in said first direction and said second direction,
  a switch being coupled to said control wherein said switch is configured to be manipulated, said switch being electrically coupled to said processor, and
  a power supply being positioned within said control, said power supply being electrically coupled to said switch, said power supply comprising at least one battery.

8. An automated grill cleaning system comprising:
a cooking unit being configured to cook, said cooking unit having a housing and a grill being positioned in said housing, said housing having an outer wall;
a cleaning unit being coupled to said cooking unit, said cleaning unit being positioned on said outer wall, said cleaning unit selectively engaging said grill, said cleaning unit urging itself to travel along said grill wherein said cleaning unit is configured to abrade debris from said grill, said mount includes a first arm, said first arm having a third side;
said cleaning unit comprises a scrubber being movably coupled to said mount, said scrubber being positioned to frictionally engage said grill thereby facilitating said scrubber to remove the debris from said grill, said scrubber comprising a cleaning member having a primary end and a secondary end, said cleaning member comprising a first half slidably engaging a second half such that said cleaning member has a slidably adjustable length, said primary end being rotatably coupled to said third side of said first arm, said cleaning member being selectively positioned in a stored position having said cleaning member being coextensive with said first arm, said cleaning member being selectively positioned in a deployed position having said cleaning member extending over said grill.

9. The system according to claim 8, further comprising:
a plurality of spacers, each of said spacers being coupled to and extending downwardly from said cleaning member, said spacers being spaced apart from each other and being distributed between said primary end and said secondary end; and
a plurality of biasing members, each of said biasing members being positioned around an associated one of said spacers.

10. The system according to claim 9, further comprising a plurality of pads, each of said pads having a first surface and a second surface, said second surface corresponding to a selected one of said pads being removably coupled to said spacers such that said first surface corresponding to said selected pad frictionally engages said grill when said cleaning member is positioned in said deployed position wherein said selected pad is configured to remove the debris from said grill, each of said biasing members extending between said second surface corresponding to said selected pad and said cleaning member such that said selected pad is biased away from said cleaning member.

11. An automated grill cleaning system comprising:
a cooking unit being configured to cook, said cooking unit having a housing and a grill being positioned in said housing, said housing having an outer wall;
a cleaning unit being coupled to said cooking unit, said cleaning unit being positioned on said outer wall, said cleaning unit selectively engaging said grill, said cleaning unit urging itself to travel along said grill wherein said cleaning unit is configured to abrade debris from said grill, said cleaning unit comprises a mount being removably coupled to said housing, said mount includes a first arm;
said cleaning unit includes a drive being positioned within coupled to said mount such that said drive urges said scrubber along said grill wherein said scrubber is configured to remove the debris from said grill, said drive comprising a plurality of first pulleys, each of said first pulleys being rotatably coupled to said first arm, each of said first pulleys being positioned within said first arm, said first pulleys being spaced apart from each other and being distributed along said first arm;
a slot extending through said first arm;
a first belt being positioned around each of said first pulleys; and
a retainer being coupled to said first belt, said retainer extending outwardly from said slot, said primary end of said cleaning member being rotatably coupled to said retainer.

12. The system according to claim 11 further comprising:
a motor being coupled to said second arm, said motor rotating in a first direction and a second direction;
a second pulley being coupled to said motor such that motor rotates said second pulley when said motor is turned on, said second pulley being positioned within said second arm; and
a second belt being coupled between said second pulley and an associated one of said first pulleys such that said second pulley rotates said first pulleys when said motor is turned on, said motor urging said cleaning member to travel along said slot when said motor is turned on.

* * * * *